US008166468B2

(12) United States Patent
Foley et al.

(10) Patent No.: US 8,166,468 B2
(45) Date of Patent: Apr. 24, 2012

(54) REFRACTOR INNER CLASS WITH OBJECT-ORIENTED PROGRAM OPTIMIZER TOOL FOR REDUCED FOOTPRINT AND FASTER APPLICATION START

(75) Inventors: Sean Christopher Foley, Ottawa (CA); Berthold Martin Lebert, Phoenix, AZ (US)

(73) Assignee: International Business Machines Corporation, Armonk, NY (US)

( * ) Notice: Subject to any disclaimer, the term of this patent is extended or adjusted under 35 U.S.C. 154(b) by 1170 days.

(21) Appl. No.: 11/948,522

(22) Filed: Nov. 30, 2007

(65) Prior Publication Data

US 2009/0144697 A1    Jun. 4, 2009

(51) Int. Cl.
  *G06F 9/44* (2006.01)
  *G06F 9/45* (2006.01)

(52) U.S. Cl. ........ 717/159; 717/116; 717/118; 717/136; 717/152; 717/153

(58) Field of Classification Search ........................ None
See application file for complete search history.

(56) References Cited

U.S. PATENT DOCUMENTS

| | | | |
|---|---|---|---|
| 6,804,682 B1 * | 10/2004 | Kemper et al. ........................ 1/1 |
| 6,807,548 B1 * | 10/2004 | Kemper ................................ 1/1 |
| 7,150,003 B2 * | 12/2006 | Naumovich et al. ........... 717/108 |
| 7,237,236 B2 * | 6/2007 | Kershenbaum et al. ....... 717/154 |
| 7,356,802 B2 * | 4/2008 | de Sutter et al. ............... 717/108 |
| 7,856,626 B2 * | 12/2010 | Abernethy et al. ............. 717/151 |
| 2004/0040017 A1 * | 2/2004 | Kershenbaum et al. ....... 717/158 |
| 2004/0103404 A1 * | 5/2004 | Naumovich et al. .......... 717/136 |
| 2004/0103405 A1 | 5/2004 | Vargas |
| 2005/0071810 A1 * | 3/2005 | Sutter et al. ................... 717/116 |
| 2008/0222616 A1 * | 9/2008 | Cheng et al. ................... 717/137 |

OTHER PUBLICATIONS

Keegan et al., NetBeans IDE Field Guide: Developing Desktop, Web, Enterprise, and MObile Applications, 2nd edition, published by Prentice Hall on May 9, 2006, USBN 0-13-239552-5, pp. 63,64, 83-101.*
Daniel et al., Automated Testing of Refactoring Engines, published on Sep. 2007, pp. 185-194.*
Tilevich et al., Binary Refactoring: Improving Code Behind the Scenes, published on May 2005, pp. 264-273.*
Kubec et al., Refactoring Test Specification version 1.1, published on May 23, 2006, pages.*
Tom Mens, An Introduction to Software Refactoring, published 2005, pp. 1-82.*

(Continued)

*Primary Examiner* — Tuan Dam
*Assistant Examiner* — Zheng Wei
(74) *Attorney, Agent, or Firm* — Yee & Associates, P.C.; David A. Mims, Jr.

(57) ABSTRACT

A computer implemented method, computer program product, and data processing system for reducing the number of inner classes in a compiled computer program written in an object-oriented programming language. An outer class of the compiled computer program is received, wherein the outer class contains an inner class, wherein the outer class comprises instructions to create an instance of an inner class. The instance is to be used as one of a callback, a listener command, a set of instructions by which an object instance of the inner class transfers information to the corresponding containing instance of the outer class, and combinations thereof. A transformation of the outer class is performed by moving methods of the inner class, as well as their contained instructions, into the outer class. The behavior of the compiled computer program remains unchanged.

25 Claims, 19 Drawing Sheets

OTHER PUBLICATIONS

Fowler et al., Refactoring: Improving the Design of Existing Code, published on Jun. 28, 1999, ISBN 0-201-48567-7, pp. 60-62, 83-101, 202-213 and 259-263.*

Igarashi et al., On Inner Classes, published 2000, pp. 129-153.*

Rayside et al., Compact Java Binaries for Embedded System, published 1999, pp. 1-14.*

Automated Code Refactoring, retrieved Oct. 30, 2007, pp. 1-5, http://www.jetbrains.com/idea/features/refactoring.html.

Convert Anonymous Inner Class to Nested Class Refactoring Specification, retrieved Nov. 26, 2007, pp. 1-2, http://refactoring.netbeans.org/refactorings/convertananymoustonested.

* cited by examiner

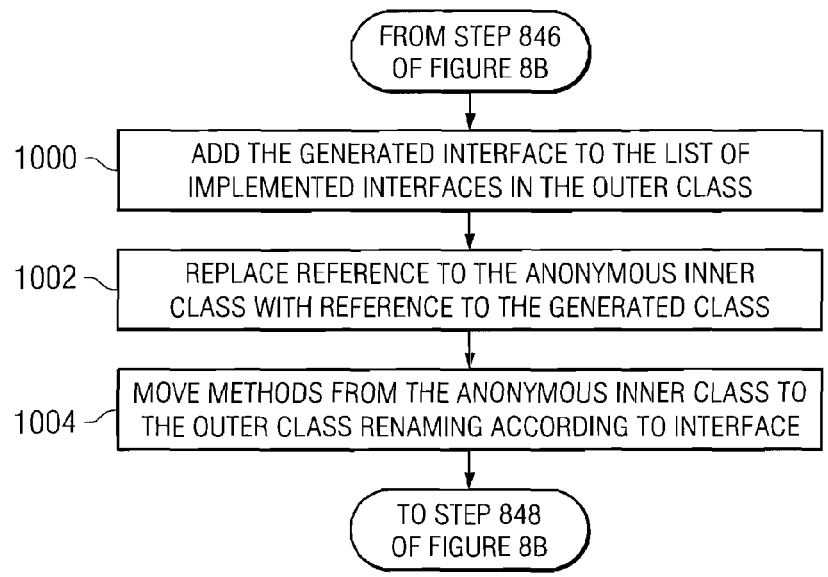

FIG. 10

```
                         1102
public class A {                                    1104
    public Properties getSystemProperties ( ) {    /
        return (Properties) AccessController.doPrivileged (new PrivilegedAction ( ) {
            public Object run ( ) {
                return System.getProperties ( ) ;
1100        }
        } ) ;
    }
}
```

FIG. 11

```
                                    1202
    public class B implements PrivilegedAction {
        public Properties getSystemProperties ( ) {
            return (Properties) AccessController.doPrivileged (this) ;
        }
1200    public Object run ( ) {
            return System.getProperties ( ) ;
        }
    }
```

FIG. 12

```
public class C {
    public Properties getSystemProperties ( ) {
        if (System.getSecurityManager ( ) == null) {
            return System.getProperties ( ) ;
        }
        return (Properties) AccessController.doPrivileged (new PrivilegedAction ( ) {
            public Object run ( ) {
                return System.getProperties ( ) ;
            }
        } ) ;
    }
}
```

```
public class D implements PrivilegedAction {
    public Properties getSystemProperties ( ) {
        if (System.getSecurityManager ( ) == null) {
            return System.getProperties ( ) ;
        }
        return (Properties) AccessController.doPrivileged ( this) ;
    }
    public Object run ( ) {
        return System.getProperties ( ) ;
    }
}
```

```
public class BO implements PrivilegedAction, Runnable {
    public Properties getSystemProperties ( ) {
        return (Properties) AccessController.doPrivileged (this) ;
    }
    public void start ( ) {
        new Thread(this) ;
    }
    public Object run ( ) {
        return System.getProperties ( ) ;
    }
    public void run ( ) {
        System.out .println("run") ;
    }
}
```

```
void java.lang.Runnable.run ( )   VS.Object
java.security.PrivilegedAction.run ( )

public class AR {
        public Properties getSystemProperties ( ) {
                return (Properties) AccessController.doPrivileged (new PrivilegedAction ( ) {
                        public Object run ( ) {
                                return System.getProperties   ( ) ;
                        }
                } ) ;
        }
        public void start ( ) {
                new Thread (new Runnable ( ) {
                        public void run ( ) {
                                System.out  .println ("run") ;
                        }
                } ) ;
        }
}

PrivilegedAction and Runnable -> 1907
        563 AR$1.class
        596 AR$2.class
        748 AR.class
Refactor PrivilegedAction -> 1483
        596 BP$1.class
        887 BP.class
Refactor Runnable -> 1510
        563 BR$1.class
        947 BR.class
```

```
public class L3 {
    private Button b1, b2, b3;
    public void createPanel (Composite parent) {
        b1 = new Button (parent, SWT.PUSH ) ;
        b1.addSelectionListener(new SelectionListener () {
            public void widgetSelected(SelectionEvent e) {
                System.out .println(L3. this.b1 + " Selected: " + e) ;
            }
            public void widgetDefaultSelected(SelectionEvent e) {
                System.out .println(L3.this.b1 + " Default Selected: " + e) ;
            }
        }):
        b2 = new Button(parent, SWT.PUSH ) ;
        b2.addSelectionListener(new SelectionListener () {
            public void widgetSelected(SelectionEvent e) {
                System.out .println(L3.this.b2 + " Selected: " + e) ;
            }
            public void widgetDefaultSelected(SelectionEvent e) {
                // do nothing
            }
        });
        b3 = new Button(parent, SWT.PUSH ) ;
        b3.addSelectionListener(new SelectionListener () {
            public void widgetSelected(SelectionEvent e) (
                // do nothing
            }
            public void widgetDefaultSelected(SelectionEvent e) {
                System.out .println(L3.this.b3 + " Default Selected: " + e) ;
            }
        });
    }
}
```

*FIG. 17*

```
public class M3 implements SelectionListener {
    private Button b1, b2, b3;
    public void createPanel (Composite parent) {
        b1 = new Button (parent, SWT.PUSH ) ;
        b1.addSelectionListener(this) {
        b2 = new Button(parent, SWT.PUSH ) ;
        b2.addSelectionListener(new SelectionListener () {
            public void widgetSelected(SelectionEvent e) {
                System.out .println(M3.this.b2 + " Selected: " + e) ;
            }
            public void widgetDefaultSelected(SelectionEvent e) {
                // do nothing
            }
        });
        b3 = new Button(parent, SWT.PUSH ) ;
        b3.addSelectionListener(new SelectionListener () {
            public void widgetSelected(SelectionEvent e) {
                // do nothing
            }
            public void widgetDefaultSelected(SelectionEvent e) {
                System.out .println(M3.this.b3 + " Default Selected: " + e) ;
            }
        });
    }
    public void widgetSelected(SelectionEvent e) {
        System.out .println(this.b1 + " Selected: " + e) ;
    }
    public void widgetDefaultSelected(SelectionEvent e) {
        System.out .println(this.b1 + " Default Selected: " + e) ;
    }
}
```

```
public class N3 {
    private Button b1, b2, b3;
    public void createPanel (Composite parent) {
        b1 = new Button (parent, SWT.PUSH ) ;
        b1.addSelectionListener(new L(1)) ;
        b2 = new Button (parent, SWT.PUSH ) ;
        b2.addSelectionListener(new L(2)) ;
        b3 = new Button (parent, SWT.PUSH ) ;
        b3.addSelectionListener(new L(3)) ;
    }
    private class L implements SelectionListener {
        private int index;
        L(int action) {
            this.index = action;
        }
        public void widgetSelected(SelectionEvent e) {
            switch (index) {
            case 1: System.out .println(N3.this.b1 + " Selected: " + e) ; return;
            case 2: System.out .println(N3.this.b2 + " Selected: " + e) ; return;
            case 3: /* do nothing */ return;
            }
        }
        public void widgetDefaultSelected(SelectionEvent e) {
            switch (index) {
            case 1: System.out .println(N3.this.b1 + " Default Selected: " + e) ; return;
            case 2: /* do nothing */ return;
            case 3: system.out .println(N3. this.b3 + " Default Selected: " + e) ; return;
            }
        }
    }
}
```

```
public class Z3 implements YC {
    private Button b1, b2, b3;
    public void createPanel (Composite parent) {
        b1 = new Button (parent, SWT.PUSH ) ;
        b1.addSelectionListener(new X3 (this, 1)) ;
        b2 = new Button (parent, SWT.PUSH ) ;
        b2.addSelectionListener(new X3 (this, 2)) ;
        b3 = new Button (parent, SWT.PUSH ) ;
        b3.addSelectionListener(new X3 (this, 3)) ;
    }
    public void ws1 (SelectionEvent e) {
        System.out .println (this.b1 + " Selected: " + e) ;
    }
    public void wds1 (SelectionEvent e) {
        System.out .println (this.b1 + " Default Selected: " + e) ;
    }
    public void ws2 (SelectionEvent e) {
        System.out .println (this.b2 + " Selected: " + e) ;
    }
    public void wds2 (SelectionEvent e) {
        // do nothing
    }
    public void ws3 (SelectionEvent e) {
        // do nothing
    }
    public void wds3 (SelectionEvent e) {
        System.out .println (this.b3 + " Default Selected: " + e) ;
    }
}
public interface YA {
    void ws1 (SelectionEvent e) ;
    void wds1 (SelectionEvent e) ;
}
public interface YB extends YA {
    void ws2 (SelectionEvent e) ;
    void wds2 (SelectionEvent e) ;
}
public interface YC extends YB {
    void ws3 (SelectionEvent e) ;
    void wds3 (SelectionEvent e) ;
}
```

FROM FIG. 20A

```
public class X3 implements SelectionListener {
        int index;
        YA o;
        public X3 (YA o, int index) {
                this.index = index;
                this.o = o;
        }
        public void widgetSelected (selectionEvent e) {
                switch (index) {
                case 1: O.ws1 (e) ; return; // return is better than break (1 byte :-)
                case 2: ((YB) o) .ws2 (e) ; return ;
                case 3: ((YC) o) .ws3 (e) ; return ;
                }
        }
        public void widgetDefaultSelected (selectionEvent e) {
                switch (index) {
                case 1: O.wds1 (e) ; return;
                case 2: ((YB) o) .wds2 (e) ; return ;
                case 3: ((YC) o) .wds3 (e) ; return ;
                }
        }
}
```

```
public class P3 implements SelectionListener {
    private Button b1, b2, b3;
    public void createPanel (Composite parent) {
        b1 = new Button (parent, SWT.PUSH ) ;
        b1.addSelectionListener(new P3 (this, 1)) ;
        b2 = new Button (parent, SWT.PUSH ) ;
        b2.addSelectionListener(new P3 (this, 2)) ;
        b3 = new Button (parent, SWT.PUSH ) ;
        b3.addSelectionListener(new P3 (this, 3)) ;
    }
    private P3 o;
    private int index;
    private P3 (P3 o, int index) {
        this.o = o;
        this.index = index;
    }
    public void widgetSelected (SelectionEvent e) {
        switch (index) {
        case 1: System.out .println (o.b1 + " Selected: " + e) ; return
;
        case 2: System.out .println (o.b2 + " Selected: " + e) ; return
;
        case 3: /* do nothing */ return;
        }
    }
    public void widgetDefaultSelected (SelectionEvent e) {
        switch (index) {
        case 1: System.out .println (o.b1 + " DefaultSelected: " +
e) ; return;
        case 2: /* do nothing */ return ;
        case 3: System.out .println(o.b3 + " Default Selected: " +
e) ; return;
        }
    }
}
```

```
public class W3 {
    private Button b1, b2, b3;
    public void createPanel (Composite parent) {
        b1 = new Button (parent, SWT.PUSH ) ;
        b1.addSelectionListener(new V3 (this, "ws1", "wds1")) ;
        b2 = new Button (parent, SWT.PUSH ) ;
        b2.addSelectionListener(new V3 (this, "ws2", null)) ;
        b3 = new Button (parent, SWT.PUSH ) ;
        b3.addSelectionListener(new V3 (this, null, "wds3")) ;
    }
    public void ws1 (SelectionEvent e) {
        System.out .println (this.b1 + " Selected: " + e) ;
    }
    public void wds1 (SelectionEvent e) {
        System.out .println (this.b1 + " Default Selected: " + e) ;
    }
    public void ws2 (SelectionEvent e) {
        System.out .println (this.b2 + " Selected: " + e) ;
    }
//      public void wds2 (SelectionEvent e) { // not called so no need to create it
//              // do nothing
//      }
//      public void ws3 (SelectionEvent e) {
//              // do nothing
//      }
    public void wds3 (SelectionEvent e) {
        System.out .println (this.b3 + " Default Selected: " + e) ;
    }
}
public class V3 implements SelectionListener {
    private Object o;
    private String [ ] n; // callback methods names
    private Method [ ] m; // widgetSelected callback
    private final static Class [ ] [ ] argTypes = new Class [ ] [ ] {
        new Class [ ] {SelectionEvent.class} ,
        new Class [ ] {SelectionEvent.class}
    } ; // in this case argTypes [ ] could be collapsed in just the variable Class [ ] argtypes
    public V3 (Object o, String m1, String m2) {
        this.o = o;
        n = new String [ ] { m1, m2 };
    }
    public void widgetSelected (SelectionEvent e) {
        invoke (1, e) ;
    }
```

FROM FIG. 22A

```
        public void widgetDefaultSelected (SelectionEvent e) {
                invoke (2, e) ;
        }
        private void invoke (int i, SelectionEvent e) {
                if (n[i] !=null) {
                        try {
                                if (m[i] == null) {
                                        m[i] = o.getClass () .getMethod (n[i] ,
argtypes [i]) ; // native calls
                                }
                                m[i} .invoke(o, new Object [] {e}); // native calls
                        } catch (InvocationTargetException t) {
                                throw (RuntimeException) t.getTargetException() ;
                        //} catch (IllegalAccessException t) { // can't happen
                        //} catch (NoSuchMethodException t) { // fall through
                        } catch (Exception t) {
                                throw new
IllegalArgumentException (e. toString() ) ;
                        }
                }
        }
}
```

REFRACTOR INNER CLASS WITH OBJECT-ORIENTED PROGRAM OPTIMIZER TOOL FOR REDUCED FOOTPRINT AND FASTER APPLICATION START

BACKGROUND OF THE INVENTION

1. Field of the Invention

The present invention relates generally to an improved data processing system and in particular to the transformation of computer usable program code. Still more particularly, the present invention relates to transforming code to remove or modify inner classes present in a computer program written in an object-oriented computer programming language.

2. Description of the Related Art

Object-oriented programming languages are ubiquitous in modern programming. Object-oriented programs are used in computers, cell phones, personal digital assistants, games, and all manner of electronic goods to implement functionality desired by users. Many object-oriented languages are used to create these programs. Examples of object-oriented programming languages include JAVA, C++, C#, and many others.

Object-oriented programming (OOP) is a programming paradigm that uses "objects" and their interactions to design applications and computer programs. Object-oriented programs may be seen as a collection of cooperating objects, as opposed to a traditional view in which a program may be seen as a list of instructions to the computer. In object-oriented programming, each object is capable of receiving messages, processing data, and sending messages to other objects. Each object can be viewed as an independent machine with a distinct role or responsibility.

Some basic concepts in object oriented programming include the notions of "class," "object," and "method." Many other concepts exist in object-oriented programming, though these three provide a fundamental understanding of the overall nature of an object-oriented program.

A class defines the abstract characteristics of a thing, or object. The abstract characteristics include the thing's characteristics, such as its attributes, fields or properties, and the thing's behaviors, such as the things the object can do or methods or features of the thing. For example, the class Cat would consist of traits shared by all cats, such as breed and fur color (characteristics), and the ability to meow (behavior). Classes provide modularity and structure in an object-oriented computer program. The code for a class should be relatively self-contained. Collectively, the properties and methods defined by a class are called members.

An object is a particular instance of a class. The class of Cat defines all possible cats by listing the characteristics and behaviors they can have. For example, the object Fluffy is one particular cat, with particular versions of the characteristics. A Cat has fur; Fluffy has brown-and-white fur. The object Fluffy is an instance of the Cat class. The set of values of the attributes of a particular object is called the state of the object. The object comprises state and the behaviour that is defined in the object's class.

A method is an object's abilities. For example, Fluffy, being a Cat, has the ability to meow. Thus, meow ( ) is one of the methods of Fluffy. Fluffy may have other methods as well, for example run ( ), eat ( ), or pounce ( ). Within the program, using a method typically should only affect one particular object. For example, all Cats can pounce, one particular cat should pounce.

Object oriented programs can have outer classes and inner classes. An inner class is a class that is defined within, or as part of, the outer class. For example, a computer program may have the outer class, such as "Animal." This outer class can include an inner class, such as "Cat."

In some object-oriented programming languages, such as JAVA, an inner class can be an anonymous inner class. An anonymous inner class is an inner class that is not directly named in the computer program. Instead, the inner class "implicitly" exists and is processed accordingly upon execution of the program.

Inner classes and anonymous inner classes are a convenient way for program developers to implement "callbacks," "event listeners," or other desirable features of a program, in which information is transferred between objects. However, using these inner classes and anonymous inner classes has a price in terms of the performance overhead of loading the inner classes, the memory required to store the inner classes, and the extra-run-time footprint required to implement the inner classes. In the case of JAVA, even if these inner classes are not loaded, the presence of these inner classes increases the time required to search through a larger JAR (JAVA Archive) file.

In many cases, the performance penalty of these inner classes is small. However, for programs designed for electronic devices with very limited processing power and memory, such as cell phones, every possible space savings and performance enhancement of a final program can be desirable.

SUMMARY OF THE INVENTION

The illustrative embodiments provide for a computer implemented method, computer program product, and data processing system for reducing a number of inner classes in a compiled computer program written in an object-oriented programming language. An outer class of the compiled computer program is received, wherein the outer class contains an inner class, wherein the outer class comprises instructions to create an instance of an inner class. The instance is to be used as one of a callback, a listener command, a set of instructions by which an object instance of the inner class transfers information to the corresponding containing instance of the outer class, and combinations thereof. A transformation of the outer class is performed by moving methods and functions of the inner class, as well as their contained instructions, into the outer class. The behavior of the compiled computer program remains unchanged.

In an illustrative embodiment, the inner class is removed. In an illustrative embodiment, less than all of the methods and functions of the inner class are moved into the outer class. In this case, a transformed version of the inner class is left in the outer class.

In an illustrative embodiment, the inner class comprises an anonymous inner class. The object-oriented programming language can be JAVA. The compiled computer program can also be JAVA bytecode. In any case, the compiled computer program can be any form of executable code. In an illustrative embodiment, the object-oriented programming language does not change as a result of performing the computer-implemented method.

In an illustrative embodiment, the compiled computer program is searched for additional inner classes. In this case, responsive to finding the additional inner classes, the transformation is performed on all outer classes that contain the additional inner classes.

In an illustrative embodiment, the compiled computer program is searched for a synthetic inner class, wherein all fields of the synthetic inner class are created by a compiler. In this case, responsive to finding the synthetic inner class, the transformation is performed on the synthetic inner class.

The illustrative embodiments also provide for a computer implemented method for reducing a number of anonymous inner classes in a compiled computer program written in an object-oriented programming language. The computer implemented method includes receiving an outer class of the compiled computer program, wherein the outer class contains an anonymous inner class which implements an interface of a type. A first determination is performed to determine whether the outer class implements the interface of the type. A first positive determination occurs if the outer class does implement the interface, though a first negative determination occurs if the outer class does not implement the interface. A second determination is performed to determine whether a method signature conflict will arise with at least one other method in the outer class if the anonymous inner class is in-lined into the outer class. A second positive determination occurs if the method signature conflict will arise, though a second negative determination occurs if the method signature conflict will not arise. Responsive to both a first negative determination and a second negative determination, the inner class is in-lined into the outer class.

In an illustrative embodiment, the inner class is removed. However, in another illustrative embodiment a transformed version of the inner class is left in the outer class.

In an illustrative embodiment, the first positive determination occurs and the second positive determination occurs. In this case, the first determination and the second determination are repeated for a second outer class. A corresponding third determination is performed and a corresponding fourth determination is also performed. Responsive to a positive third determination and a positive fourth determination, a new class is created that implements an interface of the compiled computer program and also replaces the anonymous inner class with the new class.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a flow chart of a subroutine used in the process shown in FIG. 8, in accordance with an illustrative embodiment;

FIG. 11 shows exemplary pseudo-code, in which illustrative embodiments may be implemented;

FIG. 12 shows the exemplary pseudo-code of FIG. 11 transformed to remove an anonymous inner class, in accordance with an illustrative embodiment;

FIG. 13 shows exemplary pseudo-code, in which illustrative embodiments may be implemented;

FIG. 14 shows the pseudo-code of FIG. 13 transformed to avoid an inner class from being loaded, in accordance with an illustrative embodiment;

FIG. 15 shows exemplary pseudo-code, in which illustrative embodiments may be implemented;

FIG. 16 shows the pseudo-code of FIG. 15 re-factored to avoid multiple interface types with conflicting method signatures, in accordance with an illustrative embodiment;

FIG. 17 shows exemplary pseudo-code, in which illustrative embodiments may be implemented;

FIG. 18 shows the pseudo-code of FIG. 17 in which a first inner class is removed, in accordance with an illustrative embodiment;

FIG. 19 shows the pseudo-code of FIG. 17 on which an alternative transformation is performed, in accordance with an illustrative embodiment;

FIG. 20 shows exemplary pseudo-code, in which illustrative embodiments may be implemented;

FIG. 21 shows the pseudo-code of FIG. 20 transformed such that multiple anonymous inner classes of the same type are created within one method, in accordance with an illustrative embodiment; and FIG. 22 shows the pseudo-code of FIG. 20 transformed according to a double-dispatch using reflection technique, in accordance with an illustrative embodiment.

DETAILED DESCRIPTION OF THE PREFERRED EMBODIMENT

Figure 1:
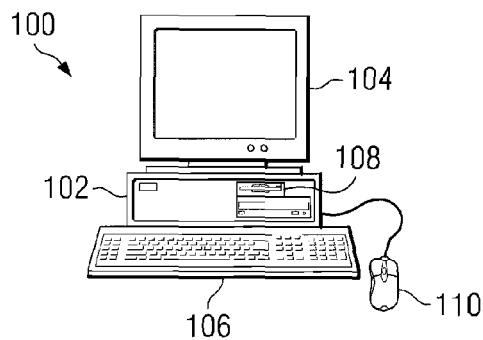
FIG. 1 is a pictorial representation of a data processing system in which illustrative embodiments may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
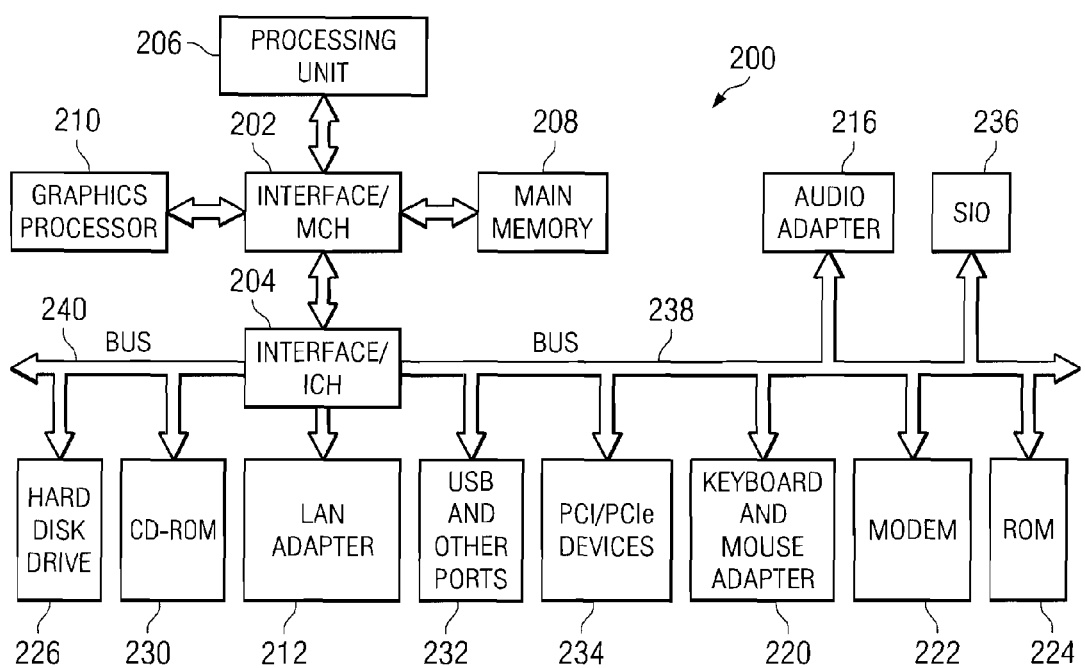
FIG. 2 is a block diagram of a data processing system in which illustrative embodiments may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including an interface and memory controller hub (interface/MCH) 202 and an interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to interface and memory controller hub 202 through an accelerated graphics port (AGP), for example.

In the depicted example, local area network (LAN) adapter 212 is coupled to interface and I/O controller hub 204, audio adapter 216, keyboard and mouse adapter 220, modem 222, read only memory (ROM) 224, universal serial bus (USB) and other ports 232. PCI/PCIe devices 234 are coupled to interface and I/O controller hub 204 through bus 238. Hard disk drive (HDD) 226 and CD-ROM 230 are coupled to interface and I/O controller hub 204 through bus 240.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206. This operating system coordinates and controls various components within data processing system 200 in FIG. 2. The operating system may be a commercially available operating system, such as Microsoft Windows Vista™. (Microsoft and Windows Vista are trademarks of Microsoft Corporation in the United States, other countries, or both). An object-oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a tablet computer, laptop computer, or telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in interface and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Figure 3:
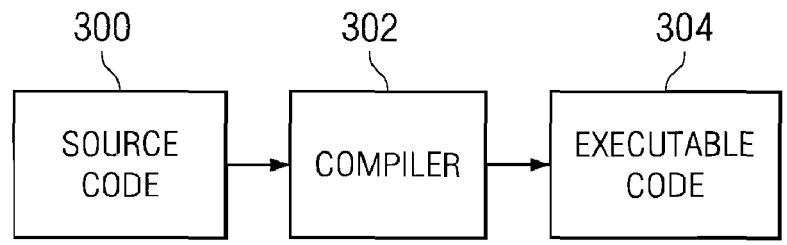
FIG. 3 is a block diagram of a prior art compiler, in which the present invention may be implemented.

FIG. 3 is a block diagram of a known compiler. Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A typical compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is generally in a desired computer-usable format and is ready for use in a data processing system.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user.

Most compilers translate a source code text file, written in a high level language, to object code or machine language, such as into an executable .EXE or .COM file that may run on a computer or a virtual machine. However, translation from a low level language to a high level language is also possible. Such a compiler is normally known as a decompiler if the compiler is reconstructing a high level language program which could have generated the low level language program. Compilers also exist which translate from one high level language to another high level language, or sometimes to an intermediate language that still needs further processing.

The illustrative embodiments can be implemented using a compiler to transform an object-oriented programming language according to the methods described herein. However, the illustrative embodiments can also be implemented using any transformation tool for transforming code. For example, a transformation tool can be used on executable code (an already compiled program) to in-line instances of inner classes into an outer class. An example of a transformation tool useful with the JAVA programming language is "Japt."

In the case of the JAVA programming language, the illustrative methods can be implemented on JAVA bytecode. JAVA bytecode is an intermediate code between the original source code and the final executable code. JAVA bytecode, which is a platform-independent format, is either interpreted or compiled using a JAVA virtual machine (JVM) at runtime in order to run on a particular platform. A platform refers to a particular combination of computer and operating system. This type of compiler inside a Java virtual machine can be referred-to as a "just in time" (JIT) compiler.

The illustrative embodiments have been performed on existing JAVA programs. Expected savings of 900 KB has been achieved for SAMETIME 7.5, 2140 KB for ECLIPSE SDK 3.2.1, and 2400 KB for NOTES 8 BETA 1. Although these memory space savings appear relatively small compared to many programs, in the case of small electronic devices, such as cell phones, these space savings are actually quite significant.

Additional space savings can also be achieved. For example, in ECLIPSE SDK 3.2.1, out of 27,325 classes, 4,389 (16%) are anonymous inner classes. Because such a large proportion of the classes are anonymous inner classes, a space savings of greater than 2140 KB is achievable. In other examples, in SAMETIME 7.5, out of 15,535 classes, 1,856 (12%) are anonymous inner classes; in NOTES 8 BETA 1, out of 53,840 classes, 4,940 (9.2%) are anonymous inner classes. Thus, the illustrative embodiments have wide applicability to many different existing, and future, computer programs written in object oriented programming languages—and particularly with respect to the JAVA programming language.

The illustrative embodiments provide for a computer implemented method, computer program product, and data processing system for reducing a number of inner classes in a compiled computer program written in an object-oriented programming language. Classes contain data members, called fields, and functional members, called methods or functions. The methods comprise instructions to be executed by the machine. An outer class of the compiled computer program is received, wherein the outer class contains an inner class, and the outer class has a method which comprises instructions to create an instance of the inner class. The instance is to be used as one of a callback, a listener command, a set of instructions by which an object instance of the inner class transfers information to the corresponding containing instance of the outer class, and combinations thereof. A transformation of the outer class is performed by moving methods of the inner class, as well as their contained instructions, into the outer class. All references to instantiated instances of the inner class are replaced with references to the containing outer class. The behavior of the compiled computer program, as perceptible to the user of the program, remains unchanged.

Figure 4:
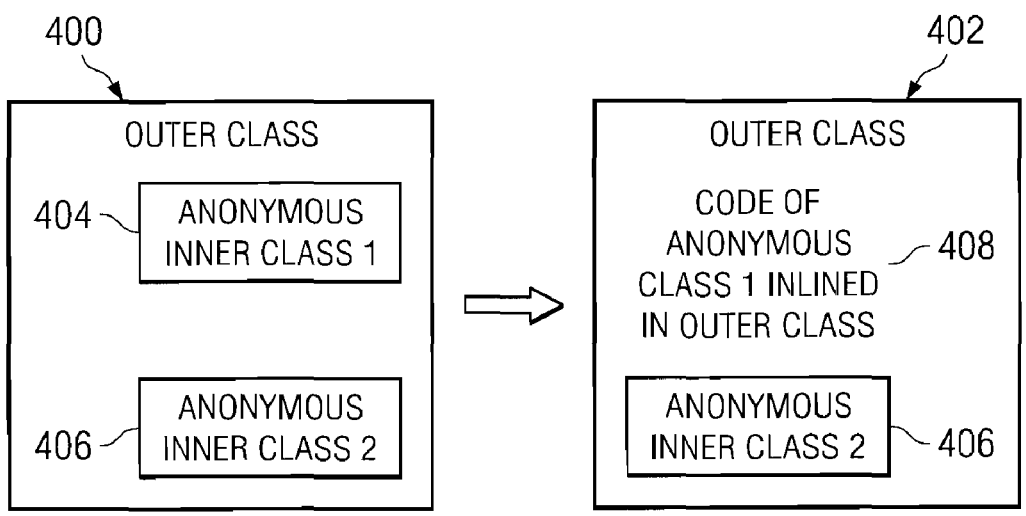
FIG. 4 is a block diagram illustrating transformation of a computer program, in accordance with an illustrative embodiment.

FIG. 4 is a block diagram illustrating transformation of a computer program, in accordance with an illustrative embodiment. The computer program shown in FIG. 4 can be implemented in a data processing system, such as data processing system 100 shown in FIG. 1 or data processing system 200 shown in FIG. 2. The transformation method described with respect to FIG. 4 can be implemented in a compiler or transformation tool, such as those described with respect to FIG. 3.

FIG. 4 shows the transformation of outer class 400 of an object-oriented computer program into outer class 402. Outer class 400 includes anonymous inner class 1, 404, and anonymous inner class 2, 406. According to an illustrative embodiment, outer class 400 is transformed into outer class 402 using a tool or compiler. As a result of transformation, outer class 402 includes the methods and their contained code of anonymous inner class 1, 404 that has been in-lined into outer class 402.

The term "in-lined", in this context, means that the creation of, and references to, instances of the inner class are replaced with references to the containing outer class. In other words, instructions to create an instance of anonymous inner class 1, 404 are changed to refer instead to the existing instance of the outer class 402. Outer class 402 thus now holds the migrated methods of anonymous inner class 1, 404 and the code within these methods, all of which previously resided in anonymous inner class 1, 404. The intent of in-lining is to improve runtime performance of all code, at the possible cost of increasing the memory size of the outer class 402. Runtime performance is improved because an instance of the anonymous inner class 1, 404 no longer needs to be created; instead, the migrated methods are called on an instance of the outer class, and their corresponding instructions are executed within this same instance of the outer class 402.

In some cases, as in anonymous inner class 1, 404, the inner class can be removed altogether. However, in other cases, the inner class can not or should not be removed. For example, if a method signature conflict will arise by inlining code from an anonymous inner class into an outer class, then the anonymous inner class should remain unchanged. Other reasons exist to leave anonymous inner classes unchanged. In this illustrative example, an unchanged version of anonymous inner class 2, 406 remains in outer class 402.

Although this illustrative example is given in the context of anonymous inner classes, this same technique can be performed on any object oriented program having outer classes and inner classes. Thus, for example, the illustrative embodiments are not limited to JAVA or similar object oriented programming languages. Similarly, this same technique can also be applied to any class architecture which mimics the outer class and inner class architecture, in which a single class instance (outer class) creates and uses a number of classes (inner classes) that are used to transmit data and events back to the original (outer) class.

Described differently, FIG. 4 illustrates an optimization of an object-oriented computer program. The optimization is to remove the creation of an instance of an inner class to be used as a one or more of a callback, a listener, and a set of instructions by which an object instance of the inner class transfers information to the corresponding containing instance of the outer class. The optimization is performed by using the pre-existing outer class for the listener, callback, or set of instructions instead. This optimization avoids unnecessary class loads and object instantiations. This optimization can be performed automatically by a compiler or by some other code optimization tool.

In an illustrative embodiment, the programming language is not changed as a result of the optimization. In an illustrative embodiment, the illustrative method may be performed at runtime in a JAVA virtual machine. In an illustrative embodiment, the illustrative method may be performed on JAVA bytecode before runtime. In an illustrative embodiment, the illustrative method may be performed on any compiled code of object oriented program.

In an illustrative embodiment, a tool, such as Japt, can distinguish candidate classes by searching for inner classes for which all fields are synthetic. A synthetic field is a field created by a compiler, usually when compiling source code into executable code or JAVA bytecode. In this embodiment, all synthetic fields are marked synthetic in the class file. Such inner classes typically have a single synthetic field which is the instance of the parent class. In an illustrative embodiment, any class with a non-synthetic field may be ignored by the transformation tool.

In another illustrative embodiment, anonymous inner classes are in-lined into an outer class if the outer class does not implement the interface itself and no method signature conflicts with other methods will arise. Otherwise, if either case occurs for more than two inner classes, then the transformation tool will create a new class that implements the interface. The new class and the interface will then be used instead of the inner classes. This "double dispatch transformation" technique is the preferred method if the interface is implemented by more than two inner classes of any outer class available for transformation. The double dispatch transformation technique is described in FIG. 5.

Figure 5:
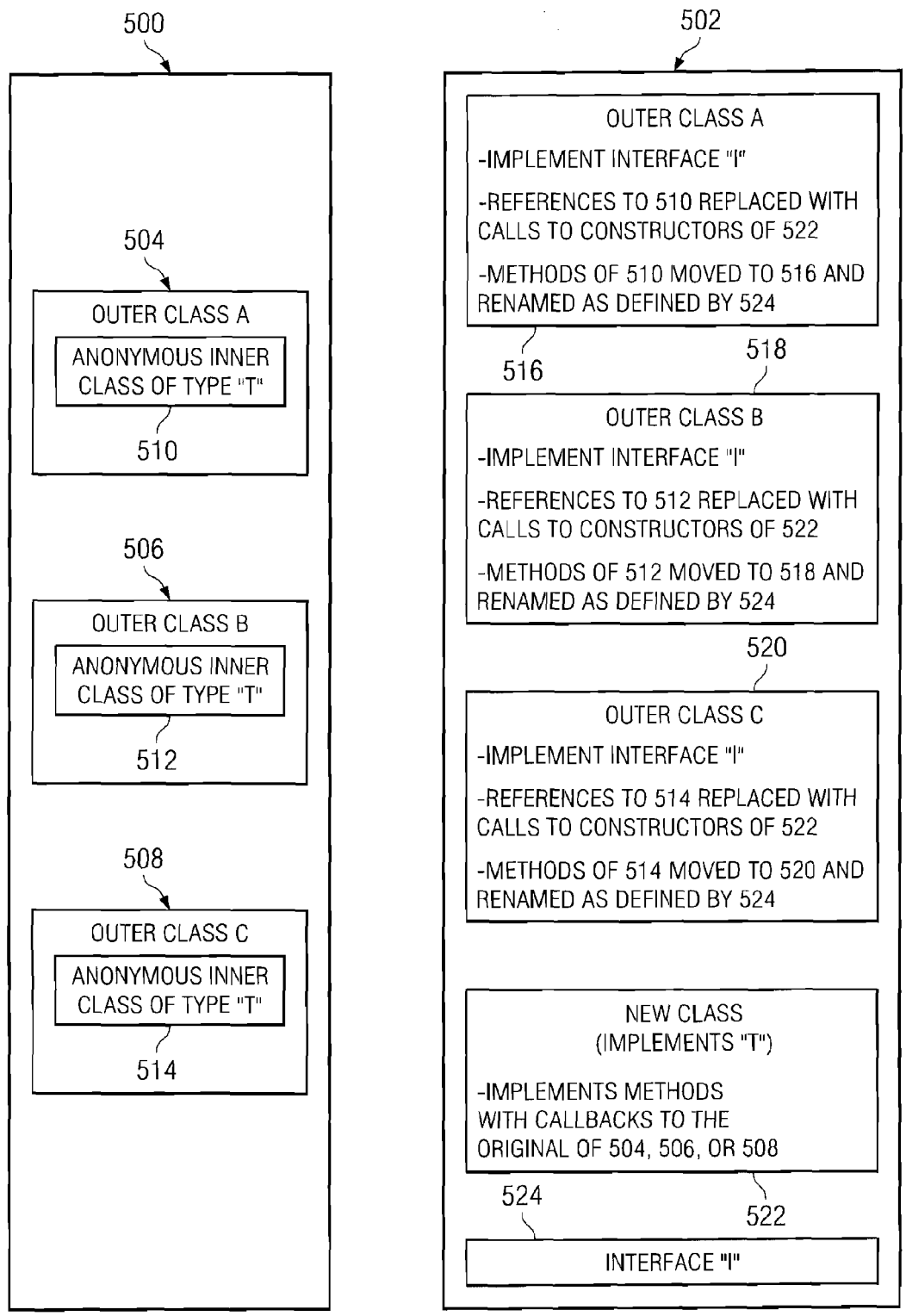
FIG. 5 is a block diagram illustrating transformation of a computer program, in accordance with an illustrative embodiment.

FIG. 5 is a block diagram illustrating transformation of a computer program, in accordance with an illustrative embodiment. The computer program shown in FIG. 5 can be implemented in a data processing system, such as data processing system 100 shown in FIG. 1 or data processing system 200 shown in FIG. 2. The transformation method described with respect to FIG. 5 can be implemented in a compiler or transformation tool, such as those described with respect to FIG. 3.

The transformation shown in FIG. 5 shows an alternative transformation method for removing anonymous inner classes from a computer program. The process shown in FIG. 5 is known as the "double dispatch" technique, which is also described further below.

FIG. 5 shows computer program 500 transformed into computer program 502. In this illustrative example, computer program 502 has the same functionality and is written in the same language as computer program 500. Additionally, in this example, computer program 500 is executable code or an intermediate code, such as JAVA bytecode. However, this transformation can be performed on any executable code presented in an object oriented programming language.

As shown in FIG. 5, computer program 500 contains three outer classes, outer class A 504, outer class B 506, and outer class C 508. Each outer class in computer program 500 contains an anonymous inner class of type "T." Thus, for example, outer class A 504 contains anonymous inner class 510; outer class B 506 contains anonymous inner class 512; and outer class C 508 contains anonymous inner class 514.

In the "double-dispatch" technique of the illustrative embodiments, the anonymous inner classes are eliminated in favor of a new class that implements type "T" and a new interface used to define method names contained in the anonymous inner classes. The outer classes of computer program 502 are all modified to implement the new interface, and the references to the anonymous inner classes are replaced with calls to constructors of the new class. The methods of each anonymous inner class are moved to the corresponding owning outer class and renamed according to new method names defined by the new interface. The new class implements methods with call backs to the original outer classes. The original anonymous inner classes are discarded.

Thus, in FIG. 5, outer class A 516, outer class B 518, and outer class C 520 correspond to outer class A 504, outer class B 506, and outer class C 508, accordingly. Additionally, computer program 502 contains new class 522 and interface "I" 524. Each outer class in computer program 502 implements interface "I" 524. References to anonymous inner class 510 are replaced with calls to constructors of new class 522. Similarly, references to anonymous inner class 512 are replaced with calls to constructors of new class 522; and references to anonymous inner class 514 are replaced with calls to constructors of new class 522. Additionally, methods of anonymous inner class 510 are moved to outer class A 516 and renamed as defined by interface "I" 524. Similarly, methods of anonymous inner class 512 are moved to outer class B 518 and renamed as defined by interface "I" 524; and, methods of anonymous inner class 514 are moved to outer class C 520 and renamed as defined by interface "I" 524.

The tool performing the transformation generates method names for Interface "I" 524. The only rule necessary to implement when naming methods, in this example, is to avoid naming conflicts with existing methods.

By eliminating the anonymous inner classes from computer program 500, the outer classes of the resulting computer program 502 increase in memory size. However, the overall memory size of computer program 502 will decrease. Additionally, the performance of computer program 502, especially the start-up time, should be enhanced relative to computer program 500, because computer program 502 will execute instructions more quickly relative to computer program 500.

Described differently, FIG. 5 illustrates an optimization of an object-oriented computer program. The optimization is to remove the creation of an instance of an inner class to be used as a one or more of a callback, a listener, and a set of instructions by which an object instance of the inner class transfers information to the corresponding containing instance of the outer class. The optimization is performed by using a new class to implement methods with callbacks to the original outer classes. Furthermore, the outer classes are modified with references to calls to constructors of the new class, and a new interface defines the names of the new methods in the outer classes. This optimization reduces the overall number of classes and their collective size, thereby decreasing the size of the overall program and shortening the time to search for classes. This optimization also avoids unnecessary class loads and object instantiations, relative to the original computer program. This optimization can be performed automatically by a compiler or by some other code optimization tool.

Figure 6:
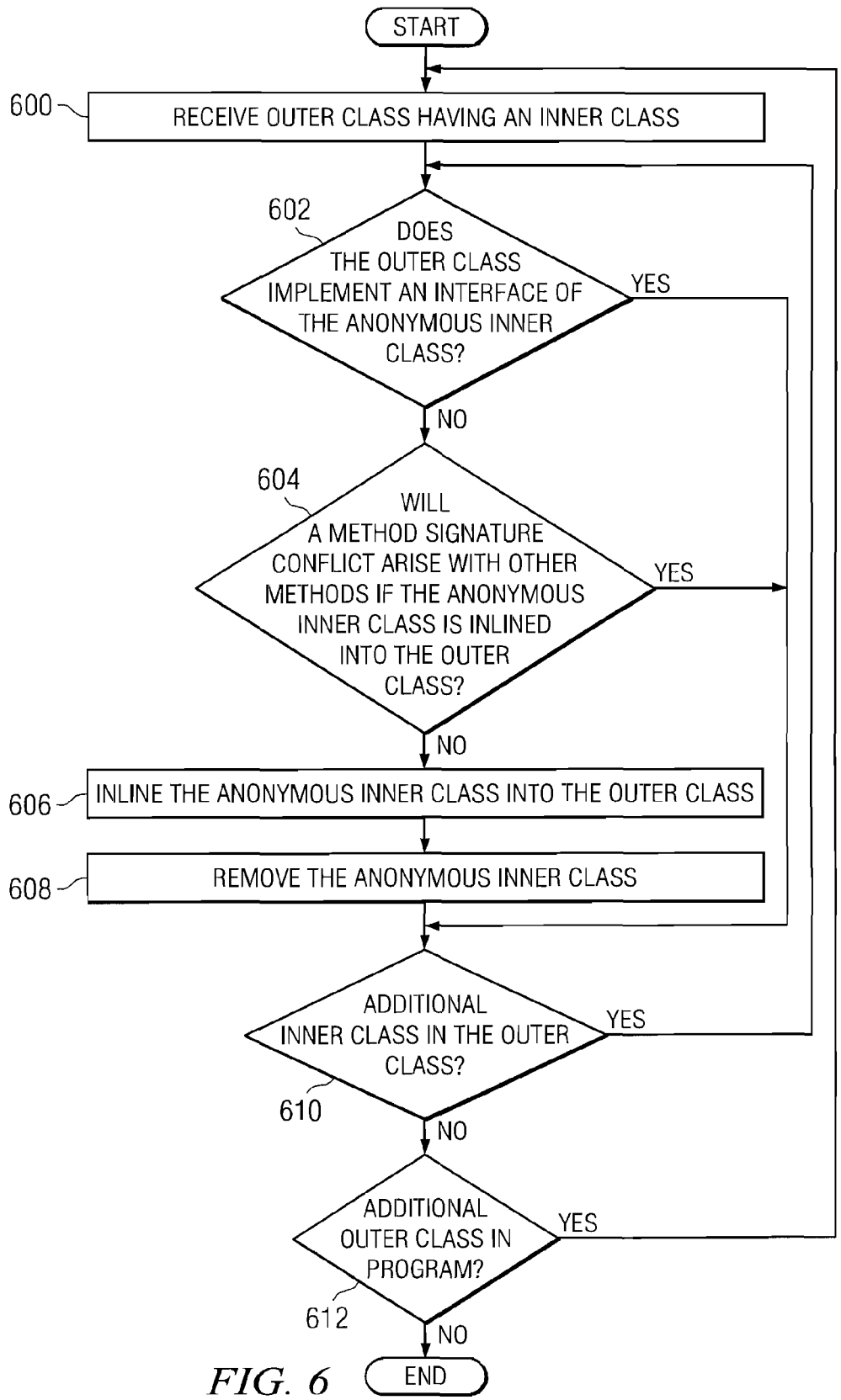
FIG. 6 is a flow chart of a process for transforming a computer program, in accordance with an illustrative embodiment.

FIG. 6 is a flow chart of a process for transforming a computer program, in accordance with an illustrative embodiment. The process shown in FIG. 6 can be implemented in a data processing system, such as data processing system 100 shown in FIG. 1 or data processing system 200 shown in FIG. 2. The process shown in FIG. 6 can be implemented using a compiler, such as compiler 300 shown in FIG. 3, or in an optimizing tool, such as that described with respect to FIG. 3. Together, a compiler or an optimizing tool can be referred to as a transformation tool.

The process begins as the transformation tool receives an outer class having an inner class (step 600). The transformation tool then determines if the code in the inner class can be moved into the outer class, as follows. The transformation tool determines whether the outer class implements an interface of the anonymous inner class (step 602). A "no" determination to step 602 results in the transformation tool making another determination as to whether a method signature conflict will arise with other methods if the anonymous inner class is in-lined into the outer class (step 604). In the case of a "no" determination to step 604, the transformation tool in-lines the anonymous inner class into the outer class (step 606). Inlining is performed by removing instructions from the anonymous inner class and inserting the removed instructions into the outer class. The transformation tool then removes the inner class (step 608).

In an illustrative embodiment, the insertion of the instructions into the outer class does not change the behavior of the transformed computer program relative to the original computer program. Additionally, in an illustrative embodiment, the transformation does not change the language of the computer program. Still further, illustrative embodiment, the transformation is performed on compiled code or on executable code.

Returning to steps 602 and 604, if either decision, 602 or 604, is a "yes" determination, then the transformation tool determines whether additional inner classes exist in the outer class (step 610). If additional inner classes do exist in the outer class, a "yes" determination to step 610, then the process returns to step 602 and repeats.

However, if no additional inner classes exist in the outer class, a "no" determination to step 610, then the transformation tool determines if additional outer classes in the program are to be analyzed (step 612). If additional outer classes are to be analyzed, a "yes" determination to step 612, then the process returns to step 600 and repeats. Otherwise, in the case of a "no" determination to step 612, the process terminates.

Figure 7:
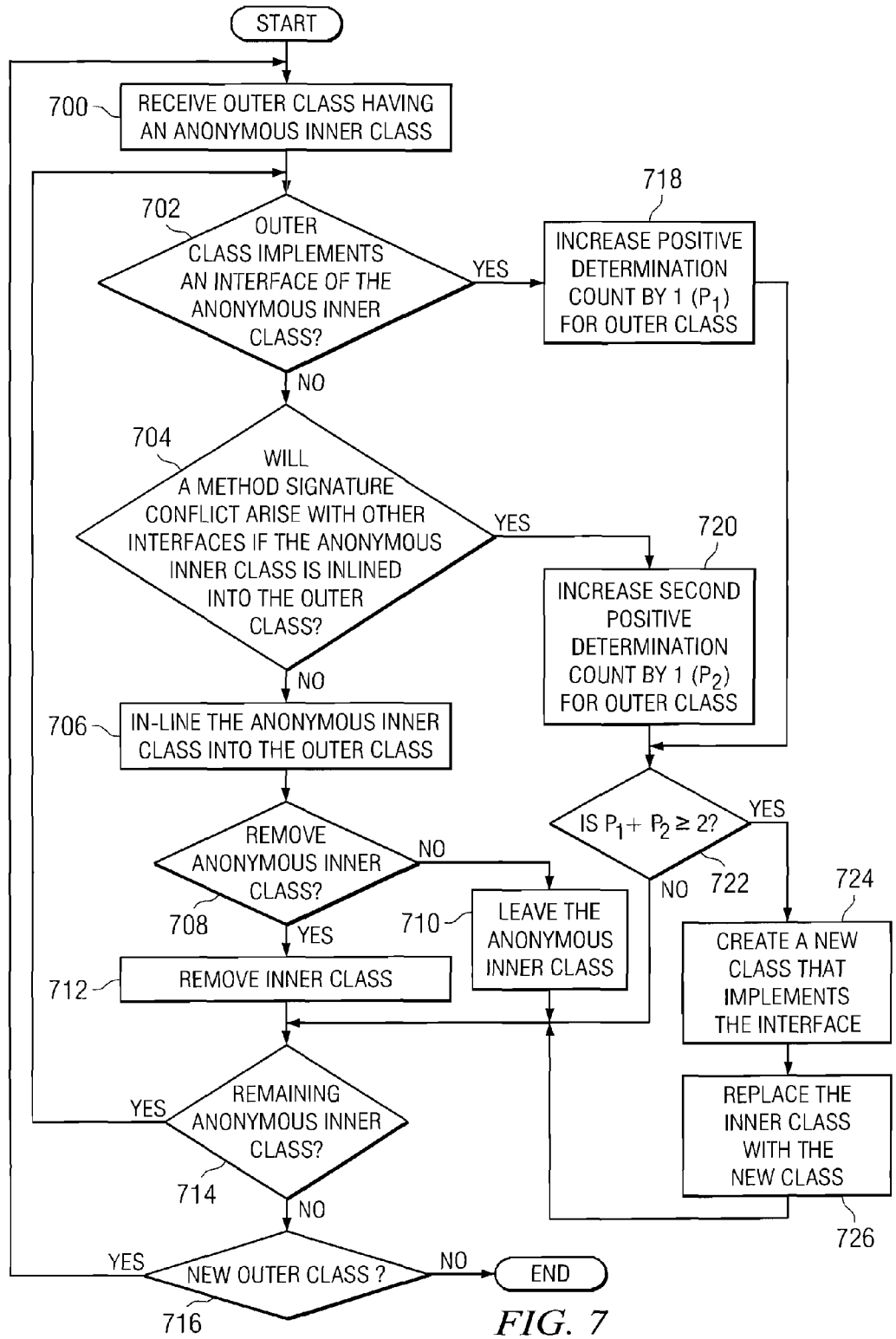
FIG. 7 is a flow chart of a process for transforming a computer program having an anonymous inner class, in accordance with an illustrative embodiment.

FIG. 7 is a flow chart of a process for transforming a computer program having an anonymous inner class, in accordance with an illustrative embodiment. The process shown in FIG. 7 can be implemented in a data processing system, such as data processing system 100 shown in FIG. 1 or data processing system 200 shown in FIG. 2. The process shown in FIG. 7 can be implemented using a compiler, such as compiler 300 shown in FIG. 3, or in an optimizing tool, such as that described with respect to FIG. 3. Together, a compiler or an optimizing tool can be referred to as a transformation tool.

The process begins as a transformation tool receives an outer class having an anonymous inner class (step 700). The transformation tool then determines whether the outer class implements an interface of the anonymous inner class (step 702). A "no" determination to step 702 results in the transformation tool making another determination as to whether a method signature conflict will arise with other interfaces if the anonymous inner class is in-lined into the outer class (step 704). In the case of a "no" determination to step 704, the transformation tool in-lines the anonymous inner class into the outer class (step 706).

The transformation tool then determines whether to remove the anonymous inner class (step 708). In the case of a "no" determination to step 708, the transformation tool leaves the anonymous inner class in the outer class (step 710). In the case of a "yes" determination to step 708, the transformation tool removes the inner class (step 712).

After either step 710 or step 712, the transformation tool determines whether any remaining anonymous inner classes are to be analyzed (step 714). In the case of a "yes" determination to step 714, the process returns to step 702 and repeats. In the case of a "no" determination to step 714, the transformation tool determines whether a new outer class is to be analyzed (step 716). In the case of a "yes" determination to step 716, the process returns to step 700 and repeats. Otherwise, in the case of a "no" determination to step 716, the process terminates.

Returning to step 702, in the case of a "yes" determination to step 702, the transformation tool increases a "positive determination count" (P1) by 1 for the outer class (step 718). The process then continues to step 722.

Returning to step 704, in the case of a "yes" determination to step 704, the transformation tool increases a "second positive determination count" (P2) by 1 for the outer class (step 720). The process then continues to step 722.

The transformation tool then determines whether P1+P2 is greater than or equal to two (step 722). In other words, the transformation tool determines whether the sum of the counts in steps 718 and 720 is two or more. In the case of a "no" determination to step 722, the process returns to step 714 and repeats.

However, in the case of a "yes" determination to step 722, the transformation tool creates a new class that implements the interface (step 724). The transformation tool also replaces the inner class with the new class (step 726). The process then returns to step 714 and repeats. Ultimately, the process will end with a "no" determination to step 716.

Figure 8A:
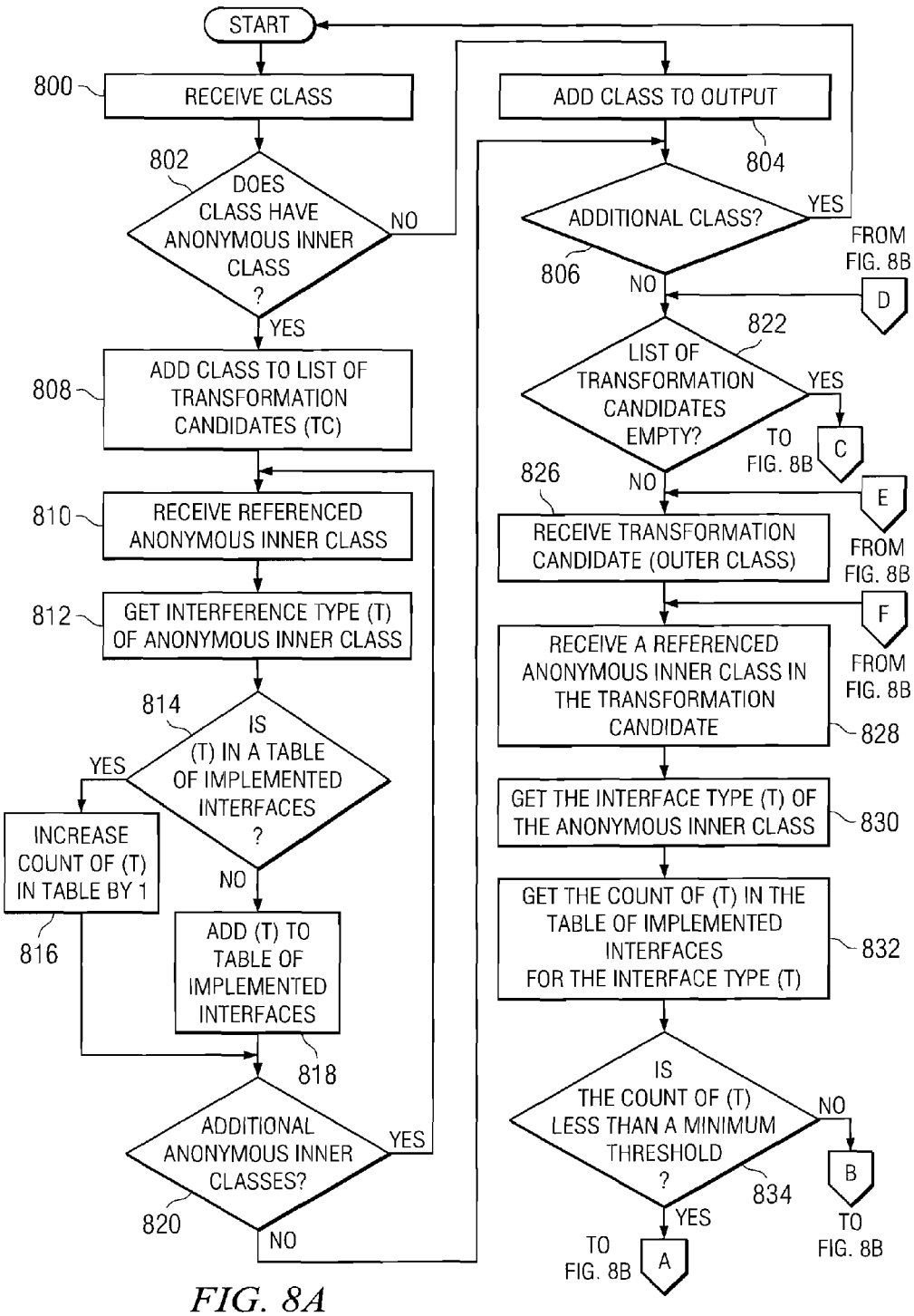
FIG. 8 is a flow chart of a process for transforming a computer program having an anonymous inner class according to a double-dispatch using reflection technique, in accordance with an illustrative embodiment.
Figure 8B:
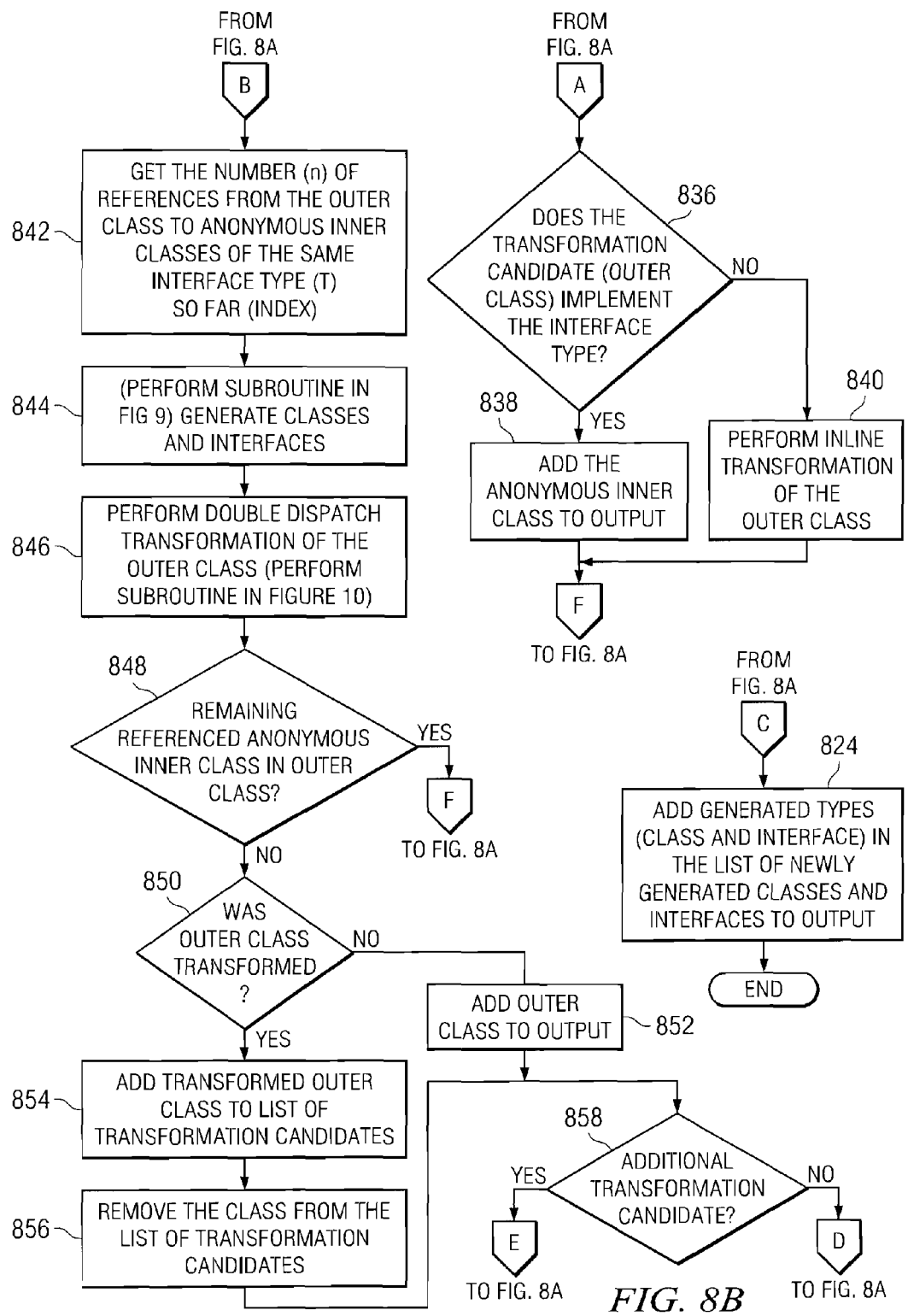

FIG. 8 is a flow chart of a process for transforming a computer program having an anonymous inner class according to a double-dispatch using reflection technique, in accordance with an illustrative embodiment. The process shown in FIG. 8 can be implemented in a data processing system, such as data processing system 100 shown in FIG. 1 or data processing system 200 shown in FIG. 2. The process shown in FIG. 8 can be implemented using a compiler, such as compiler 300 shown in FIG. 3, or in an optimizing tool, such as that described with respect to FIG. 3. Together, a compiler or an optimizing tool can be referred to as a transformation tool.

The process begins as the transformation tool receives a class (step 800). The transformation tool then determines whether the class has an anonymous inner class (step 802). If the class does not have an anonymous inner class, a "no" determination to step 802, then the transformation tool adds the class to the output (step 804). The output is a file, such as a JAVA Archive (JAR) file, with binary classes, excluding one or more anonymous inner classes. Some of the outer classes in the output are transformed to use a few newly generated classes and interfaces, instead of the removed anonymous inner classes. In any case, the process proceeds to the determination made in step 806.

Returning to step 802, if the class has an anonymous inner class, a "yes" determination to step 802, then the transformation tool adds the class to the list of transformation candidates (TC) (step 808). The transformation tool then receives a referenced anonymous inner class (step 810). The transformation tool also gets an interface type (T) of the anonymous inner class (step 812).

The transformation tool then determines if the interface type (T) is in a table of implemented interfaces (step 814). In the case of a "yes" determination to step 814, the transformation tool increases the count of interface type (T) in the table by 1 (step 816). In the case of a "no" determination to step 814, the transformation tool adds the interface type (T) to the table of implemented interfaces (step 818).

After either step 816 or step 818, the transformation tool determines whether additional anonymous inner classes are to be analyzed (step 820). In the case of a "yes" determination to step 820, the process returns to step 810 and repeats. In the case of a "no" determination to step 820, the process proceeds to step 806.

At this point, the transformation tool determines whether additional classes are to be analyzed (step 806). In the case of a "yes" determination to step 806, then the process returns to step 800 and repeats. In the case of a "no" determination to step 806, the transformation tool then determines if the list of transformation candidates (TC) is empty (step 822). In the case of a "yes" determination to step 822, the transformation tool adds generated types (classes and interfaces) in the list of newly generated classes and interfaces to the output (step 824). The process terminates thereafter.

However, if the list of transformation candidates (TC) is not empty, a "no" determination to step 822, then the transformation tool receives a transformation candidate (which is an outer class) (step 826). The transformation tool also receives a referenced anonymous inner class in the transformation candidate (step 828). The transformation tool also gets the interface type (T) of the anonymous inner class (step 830). The transformation tool also gets the count of (T) in the table of implemented interfaces for the interface type (T) (step 832).

The transformation tool then determines whether the count of interface type (T) is less than a minimum threshold (step 834). In an illustrative embodiment, the minimum threshold is the number of implementations of an interface type which, when exceeded, triggers the use of the "double dispatch transformation" technique. Otherwise, the "in-line transformation" technique described above is attempted.

In the case of a "yes" determination to step 834, the transformation tool determines whether the transformation candidate (or outer class) implements the interface type (step 836). In the case of a "yes" determination to step 836, the transformation tool adds the anonymous inner class to the output (step 838). The process then returns to step 828 and repeats. On the other hand, in the case of a "no" determination to step 836, the transformation tool performs in-line transformation of the transformation candidate, or outer class, (step 840). The process the returns to step 828 and repeats.

Returning to step 834, if the count of interface type (T) is less than the minimum threshold, a "no" determination to step 834, then the transformation tool gets the number (n) of references from the outer class to the anonymous inner class of the same interface type (T) so far (step 842). This step can be referred-to as indexing. The transformation tool then creates generated classes (GC) and interfaces (GI1 to GI<n>) (step 844). The transformation tool can perform this step by executing the subroutine described in FIG. 9. Thereafter, the transformation tool performs a double-dispatch transformation of the outer class (step 846). An example of steps used in a double-dispatch transformation can be found in FIG. 10.

The transformation tool then determines whether a remaining referenced anonymous inner class exists in the outer class (step 848). A "yes" determination to step 848 results in the transformation tool returning to step 828, wherein the process repeats from there. However, a "no" determination to step 848 causes the transformation tool to determine whether the outer class was transformed (step 850).

A "no" determination to step 850 causes the transformation tool to add the outer class to the output (step 852). The process then proceeds to step 858.

Returning to step 850, in the case of a "yes" determination to step 850, the transformation tool adds the transformed outer class to the list of transformation candidates (step 854). The transformation tool also removes the class in step 800 from the list of transformation candidates (step 856).

The transformation tool then determines whether an additional transformation candidate is to be analyzed, (step 858). In the case of a "yes" determination to step 858, the process returns to step 826 and repeats. In the case of a "no" determination to step 858, the process returns to step 822 and repeats. The process ultimately terminates when all generated types (classes and interfaces) in the list of newly generated classes and interfaces are added to the output at step 824.

Figure 9:
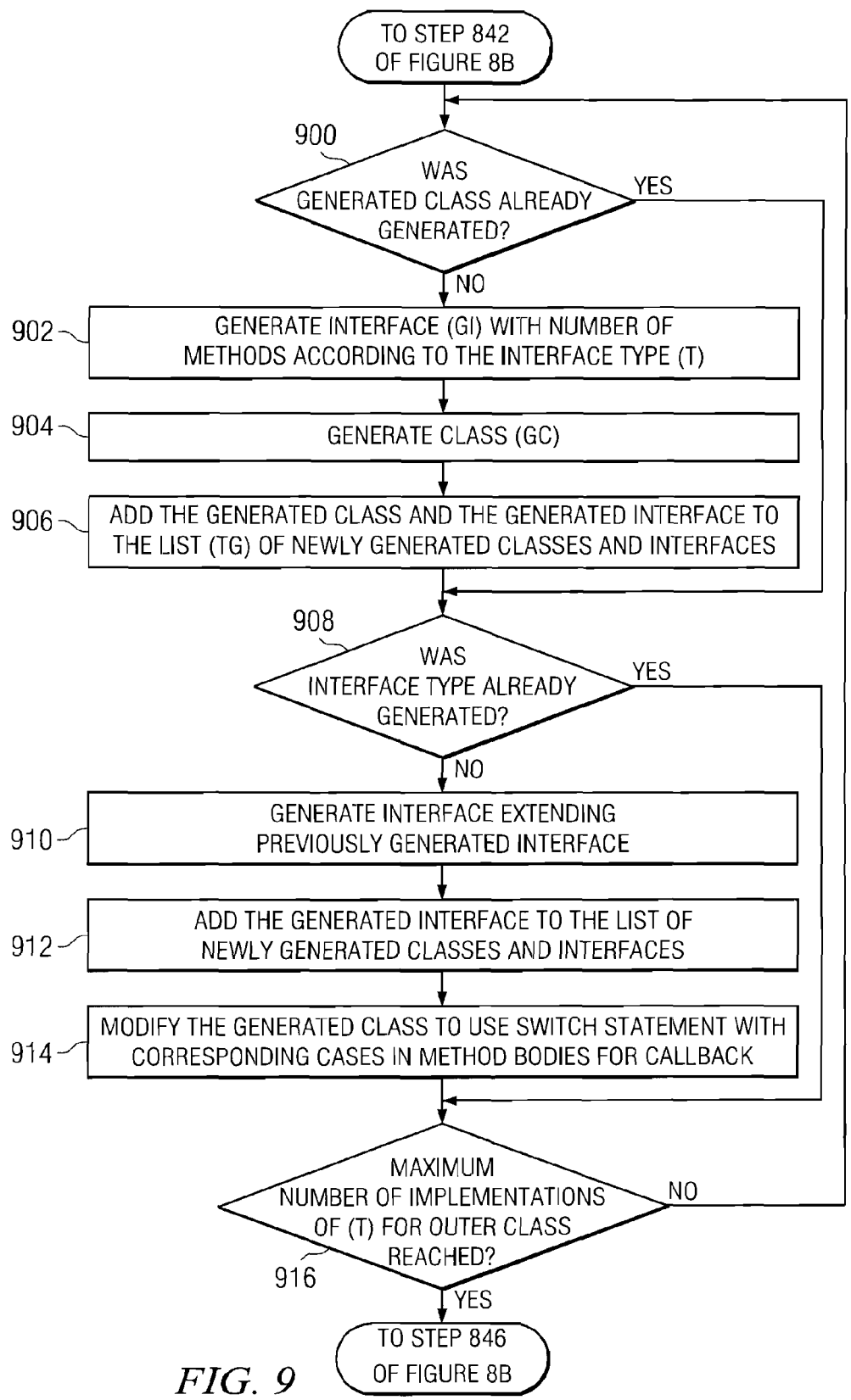
FIG. 9 is a flow chart of a subroutine used in the process shown in FIG. 9, in accordance with an illustrative embodiment.

FIG. 9 is a flow chart of a subroutine used in the process shown in FIG. 8, in accordance with an illustrative embodiment. The process shown in FIG. 9 can be implemented in a data processing system, such as data processing system 100 shown in FIG. 1 or data processing system 200 shown in FIG. 2. The process shown in FIG. 9 can be implemented using a compiler, such as compiler 300 shown in FIG. 3, or in an optimizing tool, such as that described with respect to FIG. 3. Together, a compiler or an optimizing tool can be referred to as a transformation tool.

The process begins after step 842 in FIG. 8. The transformation tool determines whether the generated class was already generated (step 900). In the case of a "yes" determination to step 900, the process proceeds to step 908. However, in the case of a "no" determination to step 900, the transformation tool generates an interface (GI) with a number of methods according to interface type (T) (step 902). The transformation tool then generates the class (GC) (step 904). The transformation tool also adds the generated class (GC) and the generated interface (GI) to the list of newly generated classes and interfaces (TG) (step 906).

The transformation tool then determines whether the interface type was already generated (step 908). In the case of a "no" determination to step 908, the transformation tool generates an interface, which extends the previously generated interface (step 910). The transformation tool also adds the generated interface to the list of newly generated classes and interfaces (step 912). The transformation tool also modifies the generated classes to use a switch statement with corresponding cases in method bodies for call back (step 914). In this step, GI<n> is used for case <n>).

In the case of a "yes" determination to step 908, or after step 914, the transformation tool determines if the maximum number of implementations of interface type (T) for the outer class has been reached (step 916). In the case of a "no" determination to step 916, the process returns to step 900 and repeats. Otherwise, in the case of a "yes" determination to step 916, the process returns to step 846 of FIG. 8, ending the subroutine of FIG. 9.

FIG. 10 is a flow chart of a subroutine used in the process shown in FIG. 8, in accordance with an illustrative embodiment. The process shown in FIG. 10 can be implemented in a data processing system, such as data processing system 100 shown in FIG. 1 or data processing system 200 shown in FIG. 2. The process shown in FIG. 10 can be implemented using a compiler, such as compiler 300 shown in FIG. 3, or in an optimizing tool, such as that described with respect to FIG. 3. Together, a compiler or an optimizing tool can be referred to as a transformation tool.

The process begins from step 846 of FIG. 8. The transformation tool adds the generated interface to the list of implemented interfaces in the outer class (step 1000). The transformation tool also replaces the reference to the anonymous inner class with a reference to the generated class (step 1002). The transformation tool also moves methods from the anonymous inner class to the outer class, renaming the outer class according to the interface (step 1004). The process then proceeds to step 848 of FIG. 8 and continues, ending the subroutine of FIG. 10.

FIG. 11 shows exemplary pseudo-code, in which illustrative embodiments may be implemented. The pseudo-code shown in FIG. 11 can be implemented in a data processing system, such as data processing system 100 shown in FIG. 1 or data processing system 200 shown in FIG. 2. The pseudo-code shown in FIG. 10 can be transformed using a compiler, such as compiler 300 shown in FIG. 3, or in an optimizing tool, such as that described with respect to FIG. 3. Together, a compiler or an optimizing tool can be referred to as a transformation tool.

In pseudo-code 1100, public class A defines outer class 1102. Similarly, anonymous inner class 1104 is shown within outer class 1102. Anonymous inner class 1104 is "anonymous" because anonymous inner class 1104 is not explicitly declared in pseudo-code 1100.

In pseudo-code 1100, a JAVA compiler creates two class files, A.class with 573 bytes and A$1.class with 558 bytes. A.class and A$1.class are standard class notation formats in the JAVA programming language. Thus, a total of 1131 bytes is used to store pseudo-code 1100.

FIG. 12 shows the exemplary pseudo-code of FIG. 11 transformed to remove an anonymous inner class, in accordance with an illustrative embodiment. The pseudo-code shown in FIG. 12 can be implemented in a data processing system, such as data processing system 100 shown in FIG. 1 or data processing system 200 shown in FIG. 2. The pseudo-code shown in FIG. 12 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1200 shows that the same functionality of pseudo-code 1100 can be achieved by using the illustrative embodiments described herein. In this case, pseudo-code 1100 has been re-factored by inlining anonymous inner class 1104 into the outer class of pseudo-code 1200, as shown by PrivlegedAction 1202.

In this case, the transformation tool creates one class file, B.class, having a size of 670 bytes. However, in this example, the A$1.class will always be loaded if A.class is loaded. Thus, the re-factored pseudo-code of FIG. 12 also improves the load time of pseudo-code 1100.

FIG. 13 shows exemplary pseudo-code, in which illustrative embodiments may be implemented. The pseudo-code shown in FIG. 13 can be implemented in a data processing system, such as data processing system 100 shown in FIG. 1 or data processing system 200 shown in FIG. 2. The pseudo-code shown in FIG. 13 can be transformed using a compiler, such as compiler 300 shown in FIG. 3, or in an optimizing tool, such as that described with respect to FIG. 3. Together, a compiler or an optimizing tool can be referred to as a transformation tool.

FIG. 13 and FIG. 14 together show that methods exist to avoid the inner class from being loaded, if the inner class is not needed. In pseudo-code 1300, C.class is 702 bytes and anonymous inner class C$1.class is 1260 bytes.

FIG. 14 shows the pseudo-code of FIG. 13 transformed to avoid an inner class from being loaded, in accordance with an illustrative embodiment. The pseudo-code shown in FIG. 14 can be implemented in a data processing system, such as data processing system 100 shown in FIG. 1 or data processing system 200 shown in FIG. 2. The pseudo-code shown in FIG. 14 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1400 is the re-factored version of pseudo-code 1300. Pseudo-code 1400 is 509 bytes smaller than pseudo-code 1300. Note that D.class is 751 bytes. This class is 49 bytes more that have to be loaded if the inner class C$1 was never needed, though this difference is negligible.

FIG. 15 shows exemplary pseudo-code, in which illustrative embodiments may be implemented. The pseudo-code shown in FIG. 15 can be implemented in a data processing system, such as data processing system 100 shown in FIG. 1 or data processing system 200 shown in FIG. 2. The pseudo-code shown in FIG. 15 can be transformed using a compiler, such as compiler 300 shown in FIG. 3, or in an optimizing tool, such as that described with respect to FIG. 3. Together, a compiler or an optimizing tool can be referred to as a transformation tool.

In pseudo-code 1500, methods that return something should be re-factored instead of using the "void" methods, if any of their methods have the same name and arguments. Note that if the interfaces in question are used in other classes, then the techniques shown in FIG. 20 through FIG. 22 will yield better memory savings. In this case, the Java compiler does not allow both interfaces to be implemented in the same class. Nevertheless, on a byte code level, implementing both interfaces in the same class is legal, and can be performed by the transformation tool.

FIG. 16 shows the pseudo-code of FIG. 15 re-factored to avoid multiple interface types with conflicting method signatures, in accordance with an illustrative embodiment. The pseudo-code shown in FIG. 16 can be implemented in a data processing system, such as data processing system 100 shown in FIG. 1 or data processing system 200 shown in FIG. 2. The pseudo-code shown in FIG. 16 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1600 is the re-factored version of pseudo-code 1500. The estimated size of BO.class in pseudo-code 1600 is 1086 bytes, which is 821 bytes less than the original code.

FIG. 17 shows exemplary pseudo-code, in which illustrative embodiments may be implemented. The pseudo-code shown in FIG. 17 can be implemented in a data processing system, such as data processing system 100 shown in FIG. 1 or data processing system 200 shown in FIG. 2. The pseudo-code shown in FIG. 17 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1700 shows an example of a using a listener callback pattern. In pseudo-code 1700, there are 3 inner classes. The L3.class is 1,190 bytes and its three inner classes are 3,504 bytes, for a total of 4,694 bytes. In the illustrative examples of FIG. 17 through FIG. 19 demonstrate dealing with multiple interface types with identical signature methods.

Inner classes with interfaces that contain methods with identical signatures can not be re-factored simply. However, if either of the interfaces is implemented by at least two other classes, the double dispatch method can be used to perform the code optimization.

FIG. 18 shows the pseudo-code of FIG. 17 in which a first inner class is removed, in accordance with an illustrative embodiment. The pseudo-code shown in FIG. 18 can be implemented in a data processing system, such as data processing system 100 shown in FIG. 1 or data processing system 200 shown in FIG. 2. The pseudo-code shown in FIG. 18 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1800 represents a transformed version of pseudo-code 1700. Pseudo-code 1800 represents a first attempt to remove an inner class from pseudo-code 1700. In pseudo-code 1800, the main class is increased to 1,845 bytes. However, by reducing one inner class 543 bytes are saved despite this increase.

FIG. 19 shows the pseudo-code of FIG. 17 on which an alternative transformation is performed, in accordance with an illustrative embodiment. The pseudo-code shown in FIG. 19 can be implemented in a data processing system, such as data processing system 100 shown in FIG. 1 or data processing system 200 shown in FIG. 2. The pseudo-code shown in FIG. 19 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 1900 represent an alterative re-factoring method on pseudo-code 1700, relative to pseudo-code 1800. Pseudo-code 1900 is an improved transformation of pseudo-code 1700, relative to pseudo-code 1800.

In pseudo-code 1900, one named inner class is created to handle all cases for the listener call back. Pseudo-code 1900 creates the N3$L.class with 1477 bytes and the main N3.class with 1140 bytes, totaling 2617 bytes. Thus, a savings of 2077 bytes is achieved than original pseudo-code 1700.

FIG. 20 shows exemplary pseudo-code, in which illustrative embodiments may be implemented. The pseudo-code shown in FIG. 20 can be implemented in a data processing system, such as data processing system 100 shown in FIG. 1 or data processing system 200 shown in FIG. 2. The pseudo-code shown in FIG. 20 can be transformed using a compiler, such as compiler 300 shown in FIG. 3, or in an optimizing tool, such as that described with respect to FIG. 3. Together, a compiler or an optimizing tool can be referred to as a transformation tool.

If anonymous inner classes of the same type are used in more than two classes, then the double-dispatch transformation technique can be used. In the double-dispatch transformation technique, one class is created that implements the interface, and all outer classes call this created class. When the object is called, then it delegates back to the original object. This technique avoids reflection, but uses a few more interfaces. Thus, the double-dispatch transformation technique results in less space savings, but comparable performance to the original code is achieved.

Pseudo-code 2000 is 3,428 bytes. The X3.class is 996 bytes. The interfaces include 1,523 bytes, 165 for YA.class, and 181 for each of the other classes. The Z3.class is 1905 bytes, which is 747 bytes less than N3+N3$L. Hence, three classes must use the same interface for this transformation technique to produce a significant benefit.

FIG. 21 shows the pseudo-code of FIG. 20 transformed such that multiple anonymous inner classes of the same type are created within one method, in accordance with an illustrative embodiment. The pseudo-code shown in FIG. 21 can be implemented in a data processing system, such as data processing system 100 shown in FIG. 1 or data processing system 200 shown in FIG. 2. The pseudo-code shown in FIG. 21 can be transformed using a compiler, such as compiler 300 shown in FIG. 3, or in an optimizing tool, such as that described with respect to FIG. 3. Together, a compiler or an optimizing tool can be referred to as a transformation tool.

Pseudo-code 2100 includes multiple anonymous inner classes of the same type created within one method. In pseudo-code 2000, the L3.class could be reduced even more after step N3 by inlining the private named N3$L class into the outer class. Pseudo-code 2100 shows the resulting transformed code.

The P3.class (1849 bytes) is much less than half the original code (2845 bytes less). In this example, the private Button fields are accessed with synthetic methods in L3, which are not created in P3. However, even without this feature, the memory savings are considerable.

However, before employing this optimization, one can take into account the runtime performance of the pseudo-code, as well as the memory consumption overhead that might occur when a new object of the outer type is created. For example, questions such as "What does the default constructor do?" "How many instance variable will exist?" and "Will initializers run?" should be considered.

These issues can be addressed using a double-dispatch using reflection transformation technique. Pseudo-code 2200 of FIG. 22 shows this technique implemented on the pseudo-code of FIG. 20.

FIG. 22 shows the pseudo-code of FIG. 20 transformed according to a double-dispatch using reflection technique, in accordance with an illustrative embodiment. The pseudo-code shown in FIG. 22 can be implemented in a data processing system, such as data processing system 100 shown in FIG. 1 or data processing system 200 shown in FIG. 2. The pseudo-code shown in FIG. 22 can be transformed using a compiler, such as compiler 300 shown in FIG. 3, or in an optimizing tool, such as that described with respect to FIG. 3. Together, a compiler or an optimizing tool can be referred to as a transformation tool.

In the pseudo-code 2200, the W3.class is reduced to 1804 bytes, with the cost for the delegation class (2407 bytes for the V3.class). However, the V3 class can be used by many more classes that use the same interface (SelectionListener). With just one user class, this example is smaller than pseudo-code 2000 by 483 bytes, but not as good as N3 or P3.

The illustrative embodiments described herein allow a transformation tool, such as Japt (available from International Business Machines Corporation of Armonk, N.Y.), to perform size reductions and performance improvements on a compiled program. The compiled program typically comprises components contributed by a number of independent providers, such as in-house developers, third party developers, or others. The illustrative embodiments can function without the need of the source code on which the compiled program is based. In many cases, the source code is not available for a number of reasons. However, the illustrative embodiments do not require the use of source code to operate.

Instead, in some cases, the illustrative embodiments operate by removing inner classes and transforming the inner classes into the owning outer classes. In other cases, the illustrative embodiments operate by using one new class and interface as a replacement for the inner classes, thereby reducing the overall number of classes without changing the behavior of the application.

The illustrative embodiments impart a number of benefits over the transformed compiled program. The benefits include a smaller size of the deployed application, faster startup performance due to fewer class load events and a shorter search path for classes, as well as some overall performance improvements due to fewer object allocations.

Thus, the illustrative embodiments provide for a computer implemented method, computer program product, and data processing system for reducing a number of inner classes in a compiled computer program written in an object-oriented programming language. An outer class of the compiled computer program is received, wherein the outer class contains an inner class, wherein the outer class comprises instructions to create an instance of an inner class. The instance is to be used as one of a callback, a listener command, a set of instructions by which an object instance of the inner class transfers information to the corresponding containing instance of the outer class, and combinations thereof. A transformation of the outer class is performed by moving methods and functions of the inner class, as well as their contained instructions, into the outer class. The behavior of the compiled computer program remains unchanged.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reducing a number of inner classes in a compiled computer program written in an object-oriented programming language, the computer implemented method comprising:
    receiving an outer class of the compiled computer program, wherein the outer class contains an inner class, wherein the outer class comprises instructions to create an instance of an inner class, and wherein the instance is to be used as one of a callback, a listener command, a set of instructions by which an object instance of the inner class transfers information to the corresponding containing instance of the outer class, and combinations thereof; and
    performing a transformation of the outer class by moving methods and functions of the inner class, as well as their contained instructions, into the outer class, and by substituting references to any created instance of the inner class with references to the outer class, wherein the behavior of the compiled computer program remains unchanged.

2. The computer-implemented method of claim 1 further comprising:
    removing the inner class.

3. The computer-implemented method of claim 1 further comprising:
    moving less than all of the methods and functions of the inner class into the outer class; and
    leaving a transformed version of the inner class in the outer class.

4. The computer-implemented method of claim 1 wherein the inner class comprises an anonymous inner class.

5. The computer-implemented method of claim 1 wherein the object-oriented programming language comprises the JAVA programming language.

6. The computer-implemented method of claim 5 wherein the compiled computer program comprises bytecode of the JAVA programming language.

7. The computer-implemented method of claim 1 wherein the compiled computer program comprises executable code.

8. The computer-implemented method of claim 1 wherein the object-oriented programming language does not change as a result of performing the computer-implemented method.

9. The computer-implemented method of claim 1 further comprising:
    searching the compiled computer program for an additional inner classes; and
    responsive to finding the additional inner classes, performing the transformation on all outer classes that contain the additional inner classes.

10. The computer-implemented method of claim 1 further comprising:
    searching the compiled computer program for a synthetic inner class, wherein all fields of the synthetic inner class are created by a compiler; and
    responsive to finding the synthetic inner class, performing the transformation on the synthetic inner class.

11. A computer implemented method for reducing a number of anonymous inner classes in a compiled computer program written in an object-oriented programming language, the computer implemented method comprising:
    receiving an outer class of the compiled computer program, wherein the outer class contains an anonymous inner class which implements an interface of a type;
    performing a first determination whether the outer class implements the interface of the type, wherein a first positive determination occurs if the outer class does implement the interface and wherein a first negative determination occurs if the outer class does not implement the interface;
    performing a second determination whether a method signature conflict will arise with at least one other method in the outer class if the anonymous inner class is in-lined into the outer class, wherein a second positive determination occurs if the method signature conflict will arise and wherein a second negative determination occurs if the method signature conflict will not arise; and
    responsive to both a first negative determination and a second negative determination, in-lining the inner class into the outer class.

12. The computer-implemented method of claim 11 further comprising:
    removing the inner class.

13. The computer-implemented method of claim 11 further comprising:

leaving a transformed version of the inner class in the outer class.

14. The computer-implemented method of claim 13 wherein the first positive determination occurs and wherein the second positive determination occurs, and wherein the method further comprises:
repeating the first determination and the second determination for a second outer class, wherein a corresponding third determination is performed and a corresponding fourth determination is performed; and
responsive to a positive third determination and a positive fourth determination, creating a new class that implements an interface of the compiled computer program and also replacing the anonymous inner class with the new class.

15. A a non-transitory computer readable storage medium storing a computer program product for reducing a number of inner classes in a compiled computer program written in an object-oriented programming language, the computer program product comprising:
instructions for receiving an outer class of the compiled computer program, wherein the outer class contains an inner class, wherein the outer class comprises instructions to create an instance of an inner class, and wherein the instance is to be used as one of a callback, a listener command, a set of instructions by which an object instance of the inner class transfers information to the corresponding containing instance of the outer class, and combinations thereof; and
instructions for performing a transformation of the outer class by moving methods and functions of the inner class, as well as their contained instructions, into the outer class, wherein the behavior of the compiled computer program remains unchanged.

16. The non-transitory computer readable storage medium of claim 15 wherein the computer program product further comprises:
instructions for removing the inner class.

17. The non-transitory computer readable storage medium of claim 15 wherein the compiled computer program comprises executable code.

18. The non-transitory computer readable storage medium of claim 15 wherein the object-oriented programming language does not change as a result of performing the computer-implemented method.

19. The non-transitory computer readable storage medium of claim 15 wherein the computer program product further comprises:
instructions for searching the compiled computer program for a synthetic inner class, wherein all fields of the synthetic inner class are created by a compiler; and
instructions for responsive to finding the synthetic inner class, performing the transformation on the synthetic inner class.

20. A non-transitory computer readable storage medium storing a computer program product for reducing a number of anonymous inner classes in a compiled computer program written in an object-oriented programming language, the computer program product comprising:
instructions for receiving an outer class of the compiled computer program, wherein the outer class contains an anonymous inner class which implements an interface of a type;
instructions for performing a first determination whether the outer class implements the interface of the type, wherein a first positive determination occurs if the outer class does implement the interface and wherein a first negative determination occurs if the outer class does not implement the interface;
instructions for performing a second determination whether a method signature conflict will arise with at least one other method in the outer class if the anonymous inner class is in-lined into the outer class, wherein a second positive determination occurs if the method signature conflict will arise and wherein a second negative determination occurs if the method signature conflict will not arise;
instructions for, responsive to both a first negative determination and a second negative determination, in-lining the inner class into the outer class.

21. The non-transitory computer readable storage medium of claim 20 wherein the computer program product further comprises:
instructions for removing the inner class.

22. The non-transitory computer readable storage medium of claim 20 wherein the computer program product further comprises:
instructions for leaving a transformed version of the inner class in the outer class.

23. The non-transitory computer readable storage medium of claim 22 wherein the first positive determination occurs and wherein the second positive determination occurs, and wherein the computer program product further comprises:
instructions for repeating the first determination and the second determination for a second outer class, wherein a corresponding third determination is performed and a corresponding fourth determination is performed;
instructions for, responsive to a positive third determination and a positive fourth determination, creating a new class that implements an interface of the compiled computer program and also replacing the anonymous inner class with the new class.

24. A data processing system comprising:
a bus;
a memory connected to the bus, the memory containing a set of instructions for reducing a number of inner classes in a compiled computer program written in an object-oriented programming language;
a processor connected to the bus, wherein the processor is adapted to execute the set of instructions to:
receive an outer class of the compiled computer program, wherein the outer class contains an inner class, wherein the outer class comprises instructions to create an instance of an inner class, and wherein the instance is to be used as one of a callback, a listener command, a set of instructions by which an object instance of the inner class transfers information to the corresponding containing instance of the outer class, and combinations thereof; and
perform a transformation of the outer class by moving methods and functions of the inner class, as well as their contained instructions, into the outer class, and by substituting references to any created instance of the inner class with references to the outer class, wherein the behavior of the compiled computer program remains unchanged.

25. The data processing system of claim 24 wherein the processor is further adapted to execute the set of instructions to:
remove the inner class.

* * * * *